(12) United States Patent
Narayana Gowda et al.

(10) Patent No.: US 11,537,555 B2
(45) Date of Patent: Dec. 27, 2022

(54) MANAGING NETWORK SHARES UTILIZING FILESYSTEM SNAPSHOTS COMPRISING METADATA CHARACTERIZING NETWORK SHARES

(71) Applicant: EMC IP Holding Company LLC, Hopkinton, MA (US)

(72) Inventors: Shivasharan Dalasanur Narayana Gowda, Kolar (IN); Sunil Kumar, Bangalore (IN); Prashant Pokharna, Ajmer (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 17/122,175

(22) Filed: Dec. 15, 2020

(65) Prior Publication Data
US 2022/0188268 A1 Jun. 16, 2022

(51) Int. Cl.
*G06F 16/11* (2019.01)
*G06F 16/182* (2019.01)

(52) U.S. Cl.
CPC .......... *G06F 16/128* (2019.01); *G06F 16/182* (2019.01)

(58) Field of Classification Search
CPC ............................. G06F 16/128; G06F 16/182
See application file for complete search history.

(56) References Cited

U.S. PATENT DOCUMENTS

| | | | | |
|---|---|---|---|---|
| 7,409,494 B2 * | 8/2008 | Edwards | .............. | G06F 3/0665 |
| | | | | 711/170 |
| 7,844,582 B1 * | 11/2010 | Arbilla | .................. | G06F 16/164 |
| | | | | 707/754 |
| 7,865,873 B1 * | 1/2011 | Zoellner | ............... | G06F 16/288 |
| | | | | 715/761 |
| 8,296,398 B2 * | 10/2012 | Lacapra | .............. | H04L 67/1097 |
| | | | | 209/217 |
| 8,510,265 B1 | 8/2013 | Boone et al. | | |
| 8,510,331 B1 * | 8/2013 | Zoellner | ............... | G06F 16/122 |
| | | | | 707/770 |

(Continued)

OTHER PUBLICATIONS

Dell Inc. "Dell EMC PowerStore: Configuring NFS Exports," May 2020, 20 pages.

(Continued)

*Primary Examiner* — Robert W Beausoliel, Jr.
*Assistant Examiner* — Susan F Rayyan
(74) *Attorney, Agent, or Firm* — Ryan, Mason & Lewis, LLP

(57) ABSTRACT

An apparatus comprises at least one processing device comprising a processor coupled to a memory. The at least one processing device is configured to identify one or more network shares of a filesystem. The at least one processing device is also configured to store, in the filesystem, at least one network share metadata file comprising metadata characterizing the identified one or more network shares of the filesystem. The at least one processing device is further configured to generate a snapshot of the filesystem, the generated snapshot comprising the at least one network share metadata file. The generated snapshot is utilizable for performing a recovery of the filesystem and the identified one or more network shares using at least a portion of the metadata from the at least one network share metadata file.

20 Claims, 7 Drawing Sheets

(56) References Cited

U.S. PATENT DOCUMENTS

| | | | | |
|---|---|---|---|---|
| 8,818,951 B1* | 8/2014 | Muntz | | G06F 16/1827 |
| | | | | 707/639 |
| 8,843,459 B1* | 9/2014 | Aston | | G06F 3/0608 |
| | | | | 709/224 |
| 8,996,837 B1 | 3/2015 | Bono et al. | | |
| 9,047,309 B1* | 6/2015 | Pawar | | G06F 16/1824 |
| 9,547,655 B1* | 1/2017 | Wang | | G06F 16/128 |
| 9,613,064 B1* | 4/2017 | Chou | | G06F 16/182 |
| 9,824,095 B1* | 11/2017 | Taylor | | G06F 16/11 |
| 10,055,305 B2* | 8/2018 | Kaplingat | | G06F 11/1458 |
| 11,249,857 B2* | 2/2022 | Naidu | | H04L 41/0816 |
| 2004/0098415 A1* | 5/2004 | Bone | | G06F 16/10 |
| 2007/0106706 A1* | 5/2007 | Ahrens | | G06F 16/128 |
| 2012/0130949 A1* | 5/2012 | Picken | | G06F 16/128 |
| | | | | 707/626 |
| 2014/0259123 A1 | 9/2014 | Haynes et al. | | |
| 2019/0236295 A1* | 8/2019 | Fair | | G06F 16/188 |
| 2019/0245746 A1* | 8/2019 | Lowry | | G06F 16/1827 |
| 2019/0377802 A1* | 12/2019 | Haber | | G06F 16/128 |
| 2020/0034537 A1* | 1/2020 | Chen | | G06F 16/951 |
| 2020/0218614 A1* | 7/2020 | Adduri | | G06F 16/128 |
| 2021/0064482 A1* | 3/2021 | Shemer | | G06F 16/128 |
| 2021/0303405 A1* | 9/2021 | Slater | | G06F 11/1466 |
| 2021/0349859 A1* | 11/2021 | Bafna | | G06F 3/0607 |
| 2021/0406136 A1* | 12/2021 | Venkatesh | | G06F 3/065 |
| 2022/0138051 A1* | 5/2022 | Yelheri | | G06F 3/0641 |
| | | | | 711/162 |
| 2022/0188267 A1* | 6/2022 | Patil | | G06F 16/1748 |

OTHER PUBLICATIONS

Red Hat, "21.7. The /etc/exports Configuration File," https://access.redhat.com/documentation/en-us/red_hat_enterprise_linux/5/html/deployment_guide/s1-nfs-server-config-exports, Accessed Dec. 14, 2020, 5 pages.

Red Hat, "18.7. The /etc/exports Configuration File,"https://web.mit.edu/rhel-doc/5/RHEL-5-manual/Deployment_Guide-en-US/s1-nfs-server-config-exports.html, Accessed Dec. 14, 2020, 4 pages.

* cited by examiner

MANAGING NETWORK SHARES UTILIZING FILESYSTEM SNAPSHOTS COMPRISING METADATA CHARACTERIZING NETWORK SHARES

FIELD

The field relates generally to information processing, and more particularly to storage in information processing systems.

BACKGROUND

In network storage environments, portions of filesystems may be shared in the form of network shares. A network share typically includes one or more shared folders of a filesystem. For a network filesystem (NFS), an NFS server creates network shares in the form of "exports" of a folder structure of the filesystem. The NFS server uses an exports file to configure the folder structure of network shares that are made accessible to NFS clients.

SUMMARY

Illustrative embodiments of the present disclosure provide techniques for managing network shares using filesystem snapshots that comprise metadata characterizing network shares of filesystems.

In one embodiment, an apparatus comprises at least one processing device comprising a processor coupled to a memory. The at least one processing device is configured to perform the steps of identifying one or more network shares of a filesystem, and storing, in the filesystem, at least one network share metadata file comprising metadata characterizing the identified one or more network shares of the filesystem. The at least one processing device is also configured to perform the step of generating a snapshot of the filesystem, the generated snapshot comprising the at least one network share metadata file. The generated snapshot is utilizable for performing a recovery of the filesystem and the identified one or more network shares using at least a portion of the metadata from the at least one network share metadata file.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
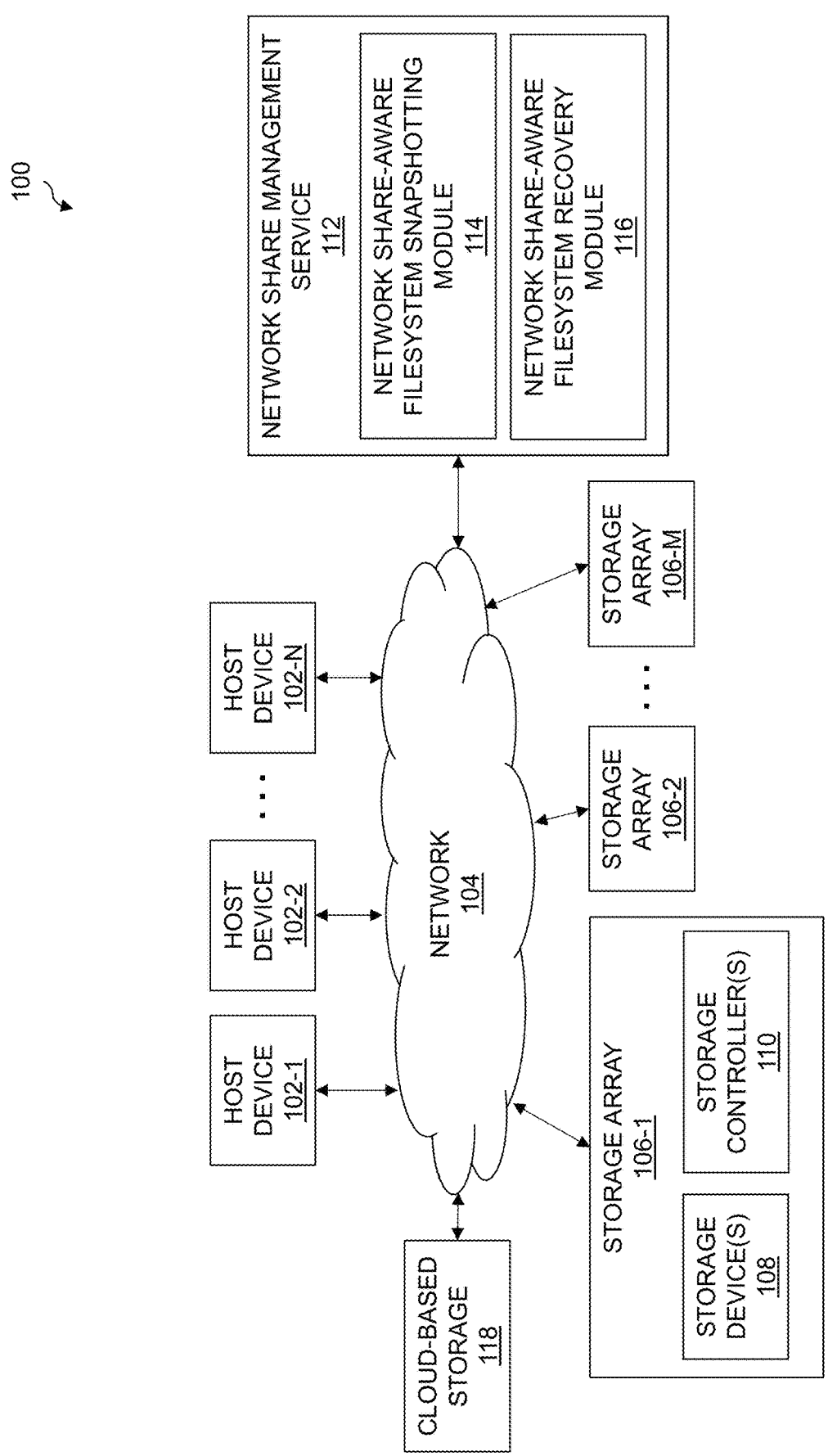
FIG. 1 is a block diagram of an information processing system for managing network shares using network share-aware filesystem snapshots in an illustrative embodiment.

FIG. 1 shows an information processing system 100 configured in accordance with an illustrative embodiment to manage network shares using network share-aware filesystem snapshots, including generation of network share-aware filesystem snapshots as well as recovery and restore operations using the network share-aware filesystem snapshots. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-

Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, the host devices 102 are assumed to access one or more storage volumes provided by the storage arrays 106 through network shares. The network shares may be in the form of network filesystem (NFS) exports of NFS filesystems. For example, the host devices 102 may run respective NFS clients that access NFS exports exposed by NFS servers. The NFS servers may run on storage controllers of one or more of the storage arrays 106 (e.g., on storage controllers 110 of storage array 106-1), or may run external to the storage arrays 106 (e.g., a standalone NFS server). In some cases, one of the host devices 102 (e.g., host device 102-1) may run or operate an NFS server itself, and may expose NFS shares or exports to a different application running on that host device, or to applications running on other ones of the host devices (e.g., host devices 102-2 through 102-N). It should be noted, however, that embodiments are not limited solely to use with network shares that are NFS exports.

The information processing system 100 further includes a network share management service 112 that is configured to provide functionality for generating network-share aware snapshots of filesystems (e.g., exports-aware snapshots of NFS filesystems for NFS exports that are made accessible by NFS servers to NFS clients) utilizing a network share-aware filesystem snapshotting module 114, and for recovering or restoring such network share-aware filesystem snapshots using network share-aware filesystem recovery module 116. The network share-aware filesystem snapshots may be stored on one or more of the storage arrays 106, on cloud-based storage 118, etc. The network share-aware filesystem snapshotting module 114 is configured to identify network shares for a filesystem, and to store metadata characterizing the identified network shares in at least one network share metadata file in the filesystem. The network share-aware filesystem snapshotting module 114 is also configured to generate snapshots of the filesystem, where such snapshots include the at least one network share metadata file such that the generated snapshots contain knowledge of the network shares of the filesystem at the point in time that the snapshot is generated. The network share-aware filesystem recovery module 116 is configured to recover or restore the filesystem and its associated network shares using such network share metadata files included in the generated filesystem snapshots.

At least portions of the functionality of the network share-aware filesystem snapshotting module 114 and the network share-aware filesystem recovery module 116 may be implemented at least in part in the form of software that is stored in memory and executed by a processor.

Although shown as external to the host devices 102 and storage arrays 106 in the FIG. 1 embodiment, it should be appreciated that the network share management service 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and network share management service 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the network share management service 112 may be implemented on respective distinct processing platforms, although numerous other arrangements are possible. For example, in some embodiments at least portions of one or more of the host devices 102, the storage arrays 106 and the network share management service 112 are implemented on the same processing platform. The network share management service 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the network share management service 112 may be implemented at least in part in the first geographic location, the second geographic location, and one or more other geographic locations. Thus, it is possible in some implementations of the system 100 for different ones of the host devices 102, the storage arrays 106 and the network share management service 112 to reside in different data centers.

Numerous other distributed implementations of the host devices 102, the storage array 106 and the network share management service 112 are possible. Accordingly, the host devices 102, the storage array 106 and the network share management service 112 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for managing network shares using network share-aware filesystem snapshots is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for managing network shares using network share-aware filesystem snapshots will now be described in more detail with reference to the flow diagram of FIG. 2. It is to be understood that this particular process is only an example, and that additional or alternative processes for managing network shares using network share-aware filesystem snapshots may be used in other embodiments.

In this embodiment, the process includes steps 200 through 206. These steps are assumed to be performed by the network share management service 112 utilizing the network share-aware filesystem snapshotting module 114 and the network share-aware filesystem recovery module 116. The process begins with step 200, identifying one or more network shares of a filesystem. The filesystem may comprise an NFS filesystem, with the one or more network shares comprising NFS exports.

In step 202, at least one network share metadata file is stored in the filesystem. The at least one network share metadata file comprises metadata characterizing the one or more network shares of the filesystem identified in step 200. The metadata characterizing a given one of the identified one or more network shares of the filesystem may comprise layout information for a folder structure of the filesystem utilized by the given network share, where the folder structure may comprise a nested folder structure of the given network share. The metadata characterizing a given one of the identified one or more network shares of the filesystem may also or alternatively comprise access information for the given network share, security information for the given network share, etc.

In step 204, a snapshot of the filesystem is generated. The snapshots generated in step 204 comprises the at least one network share metadata file. The generated snapshot is utilizable for performing a recovery of the filesystem and the identified one or more network shares using at least a portion of the metadata from the at least one network share metadata file.

Figure 2:
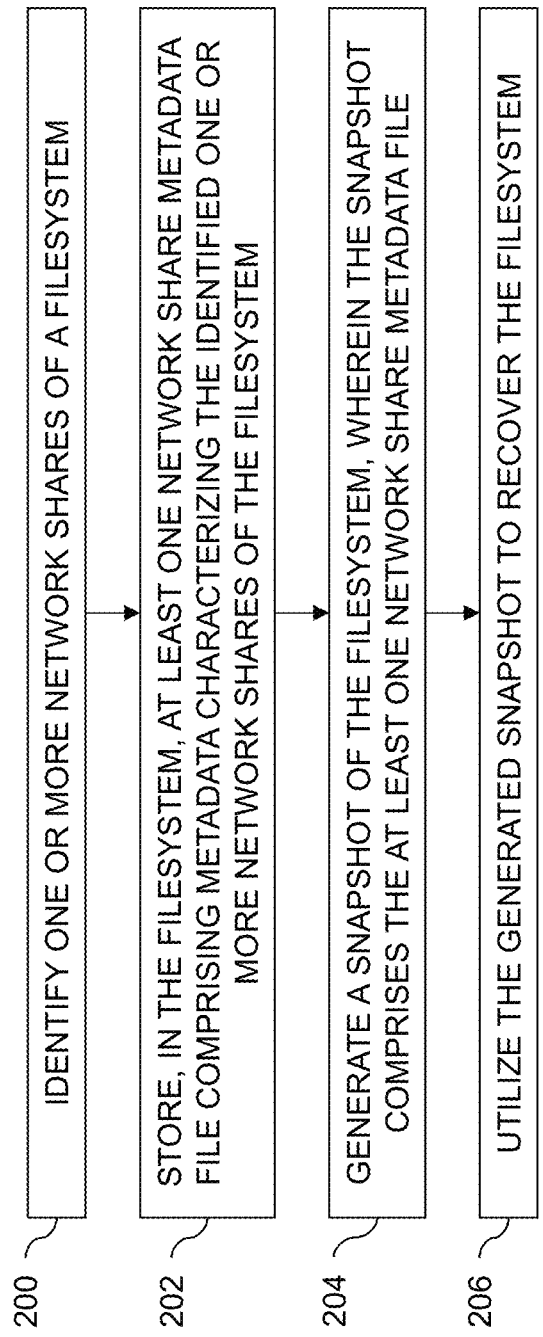
FIG. 2 is a flow diagram of an exemplary process for managing network shares using network share-aware filesystem snapshots in an illustrative embodiment.

The FIG. 2 process continues with step 206, utilizing the snapshot generated in step 204 to recover the filesystem. It should be noted that step 206 need not be performed by the same entity that generated the snapshot in step 204. Step 206, in some embodiments, includes utilizing the generated snapshot to recover the filesystem and the identified one or more network shares using at least a portion of the metadata from the at least one network share metadata file. More generally, step 206 may include receiving an instruction to recover the filesystem, the instruction comprising one or more recovery parameters, and determining whether to restore the identified one or more network shares based at least in part on the one or more recovery parameters in the received instruction. The one or more recovery parameters may specify performance of a network share-unaware recovery of the filesystem, where step 206 includes recovering the filesystem without recovering the identified one or more network shares. The one or more recovery parameters may alternatively specify performance of a network share-aware recovery of the filesystem, where step 206 includes recovering the filesystem and the identified one or more network shares. The one or more recovery parameters may further specify different types of network share-aware recovery of the filesystem, such as: a network share-aware recovery of the filesystem without host access where step 206 includes recovering the identified one or more network shares without host access to the identified one or more network shares; a network share-aware recovery of the filesystem with suffix information where step 206 includes recovering the identified one or more network shares with a designated suffix; network share-aware recovery of the filesystem to a clone where step 206 includes recovering the filesystem and the identified one or more network shares to a designated clone; combinations thereof; etc.

In a network file storage environment, a filesystem's folder structure and respective network shares can vary over time. In the description below, it is assumed for clarity of illustration that the network shares comprise NFS exports. It should be appreciated, however, that embodiments are not limited solely to use with NFS, and that the techniques described are more generally applicable to management of network shares using filesystem snapshots that are made aware of the network shares of that filesystem. Because network share or exports' layout can vary over time, during recovery or restore operations snapshot users are not able to easily restore or recover exports and associated export-related data (e.g., access, security, etc.). With conventional NFS filesystem snapshots, users can only restore or recover the NFS filesystem data—users do not have the option to easily and instantly restore or recover exports along with the NFS filesystem data. There is a thus a need for application backup or copy data management (CDM) software or tools which can recover an application quickly to point-in-time filesystem snapshot data that is aware of the NFS exports. Conventional approaches rely on application backup or CDM software or tools that manually manage and restore or recover modified NFS export layouts, thus increasing the recovery time objective (RTO) for applications.

Figure 3:
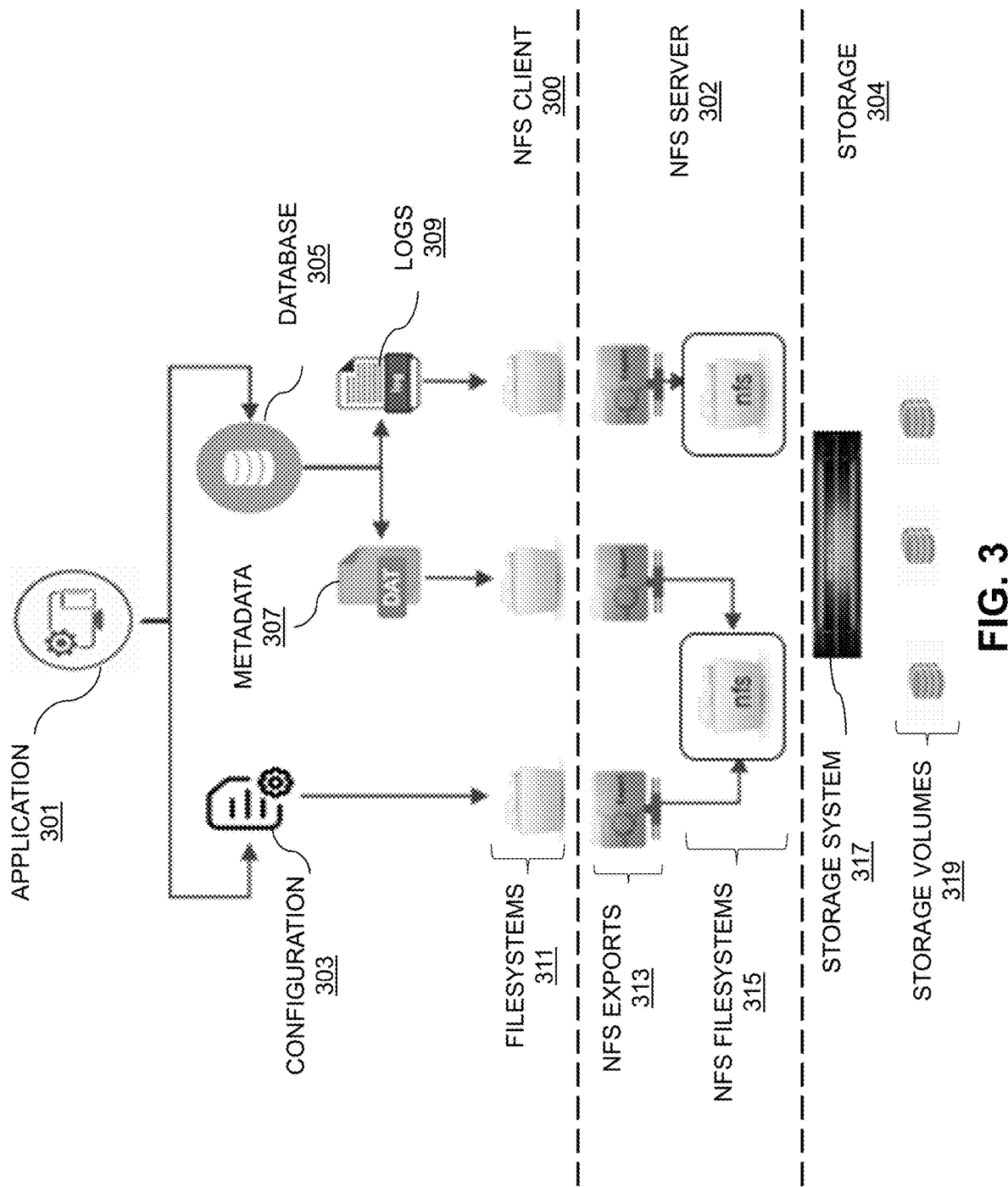
FIG. 3 shows an example architecture of a network filesystem client, server and storage layer in an illustrative embodiment.

FIG. 3 shows an example architecture, which includes an application 301 having an associated configuration 303 and database 305. The database 305 stores metadata 307 and logs 309. The configuration 303 and database 305 (including the metadata 307 and logs 309) are stored in filesystems 311. The application 301, configuration 303, database 305, metadata 307, logs 309 and filesystems 311 in this example are part of or accessible to an NFS client 300. An NFS server 302 includes NFS exports 313 and NFS filesystems 315. A storage layer 304 includes a storage system 317 and storage volumes 319. The NFS server 302 uses NFS exports 313 to make portions of the NFS filesystems 315 available to the NFS client 300. For example, the NFS exports 313 may be used to share one or more directories or folders of the NFS filesystems 315 with the NFS client 300. The NFS client 300 mounts the directories that are exported by the NFS server 302 as the filesystems 311.

Figure 4:
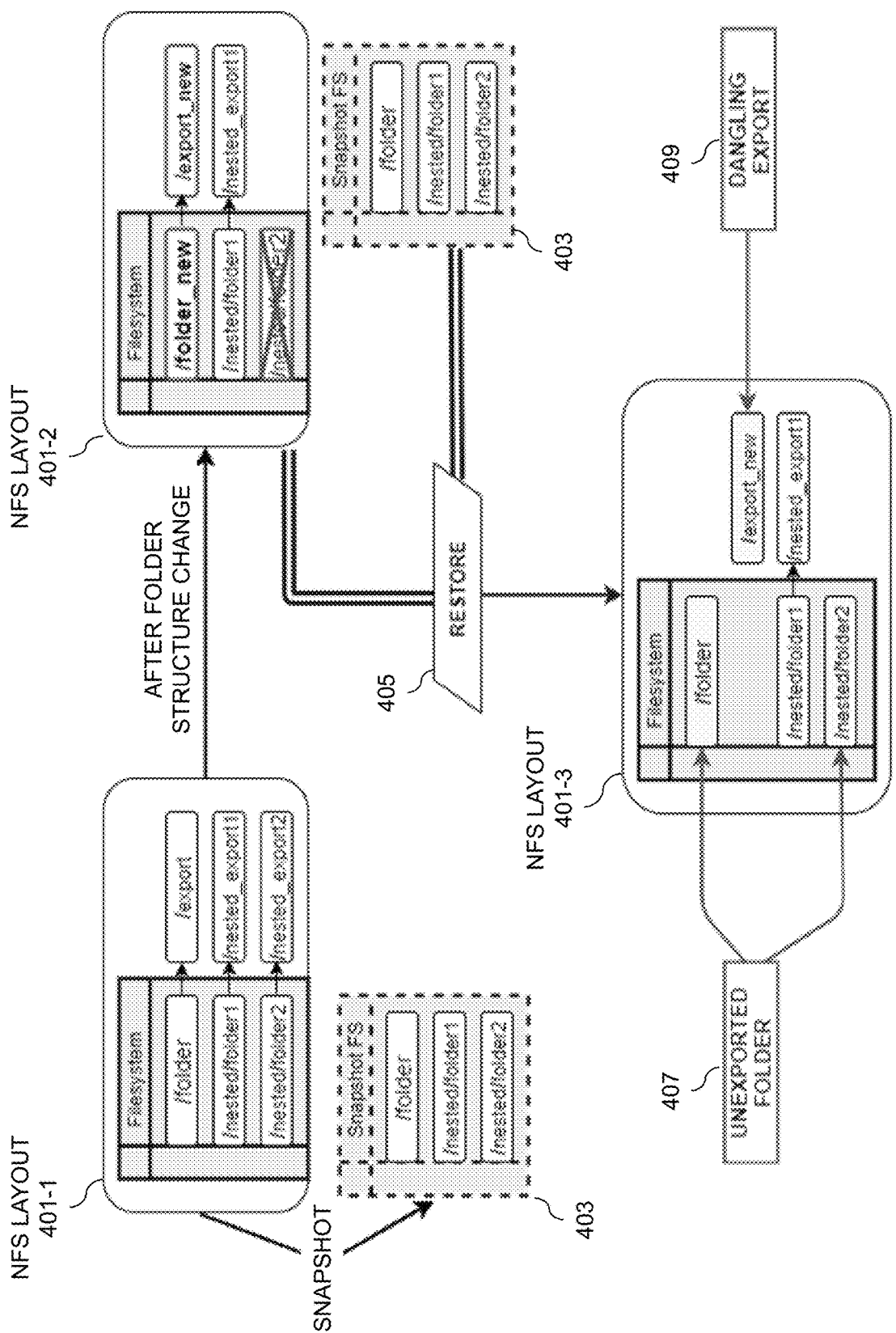
FIG. 4 shows network filesystem layouts before a folder structure change, after a folder structure change, and following a restore operation from a non-exports-aware filesystem snapshot in an illustrative embodiment.

FIG. 4 shows a set of NFS layouts 401-1, 401-2 and 401-3 (collectively, NFS layouts 401). The NFS layout 401-1 comprises a filesystem including /folder, /nested/folder1 and /nested/folder2 with associated exports /export, /nested_export1, and /nested_export2. In the FIG. 4 example, the NFS export (/export) of NFS layout 401-1 includes the two nested folders of the filesystem (/nested/folder1 and /nested/folder2). Although not shown for clarity of illustration, the filesystem may include various other folders which are not part of the NFS export. A snapshot 403 is generated of the filesystem that is part of the NFS layout 401-1. The snapshot 403 may comprise a point-in-time snapshot of all of the filesystem data, but not the exports.

After a folder structure change of an export, the NFS layout 401-1 is updated to NFS layout 401-2. In the FIG. 4 example, the updated NFS layout 401-2 includes a filesystem structure with a new export layout (e.g., /folder new with associated export/export_new). The new export layout includes /nested/folder1 but not /nested/folder2. It should be noted that this does not mean that the /nested/folder2 is actually removed or deleted from the filesystem—it may just not be part of the new export.

If a user initiates a restore operation 405 for the filesystem using the snapshot 403, the resulting recovered or restored NFS layout 401-3 will include the filesystem from the snapshot 403 (e.g., including /folder, /nested/folder1 and /nested/folder2). However, since there is no information in the snapshot 403 relating to point-in-time exports for the filesystem, the export data would be unchanged from the updated NFS layout 401-2. As such, the NFS layout 401-3 includes an unexported folder 407 (e.g., /nested/folder2). The NFS layout 401-3 also includes a dangling export 409 (e.g., /export_new which was not part of the NFS layout 401-1 associated with the snapshot 403).

The non-exported folder paths and dangling exports (e.g., 407 and 409 in the FIG. 4 example) thus need to be managed manually. As such, there is a clear gap in conventional filesystem snapshot technologies that capture only filesystem data but not associated network share information. This gap requires users to manually restore and recover exports (or other network shares), such as by creating, modifying and/or validating the exports manually after snapshot operations (e.g., after the restore operation 405 in the FIG. 4 example). Exports, or more generally network shares, may be an essential part of storage array filesystems. Conventional snapshot technologies, however, require filesystem snapshot users to deal with exports separately and independently, giving rise to increased RTO.

Illustrative embodiments provide techniques for making filesystem snapshots "export-aware." In some embodiments, filesystem snapshots are made export-aware by updating a metadata file (e.g., a ".exports" file in the NFS filesystem each time an export is created, modified or deleted). For example, the NFS filesystem may be stored in /NFSFilesystem and the exports metadata may be stored in /NFSFilesystem/.exports. The ".exports" file is synchronized with the current state of exports for a given NFS filesystem, including the exports of the nested folder structure. When a snapshot of the NFS filesystem is taken, the metadata in the ".exports" file becomes part and parcel of the snapshot. During an NFS filesystem restore operation, the metadata in the ".exports" file can be used by the NFS servers and/or storage controllers of underlying storage arrays to restore the exports to their state as recorded in the point-in-time exports-aware snapshots.

In some embodiments, the ".exports" file can also be managed by the NFS server or storage controller (e.g., one file for all NFS servers/filesystems, one file for each NFS server/filesystem, etc.). NFS servers with persistence can also use filesystem and export entity relationships to persist this information, although this is more complex than making filesystem snapshots export-aware as described above.

Figure 5:
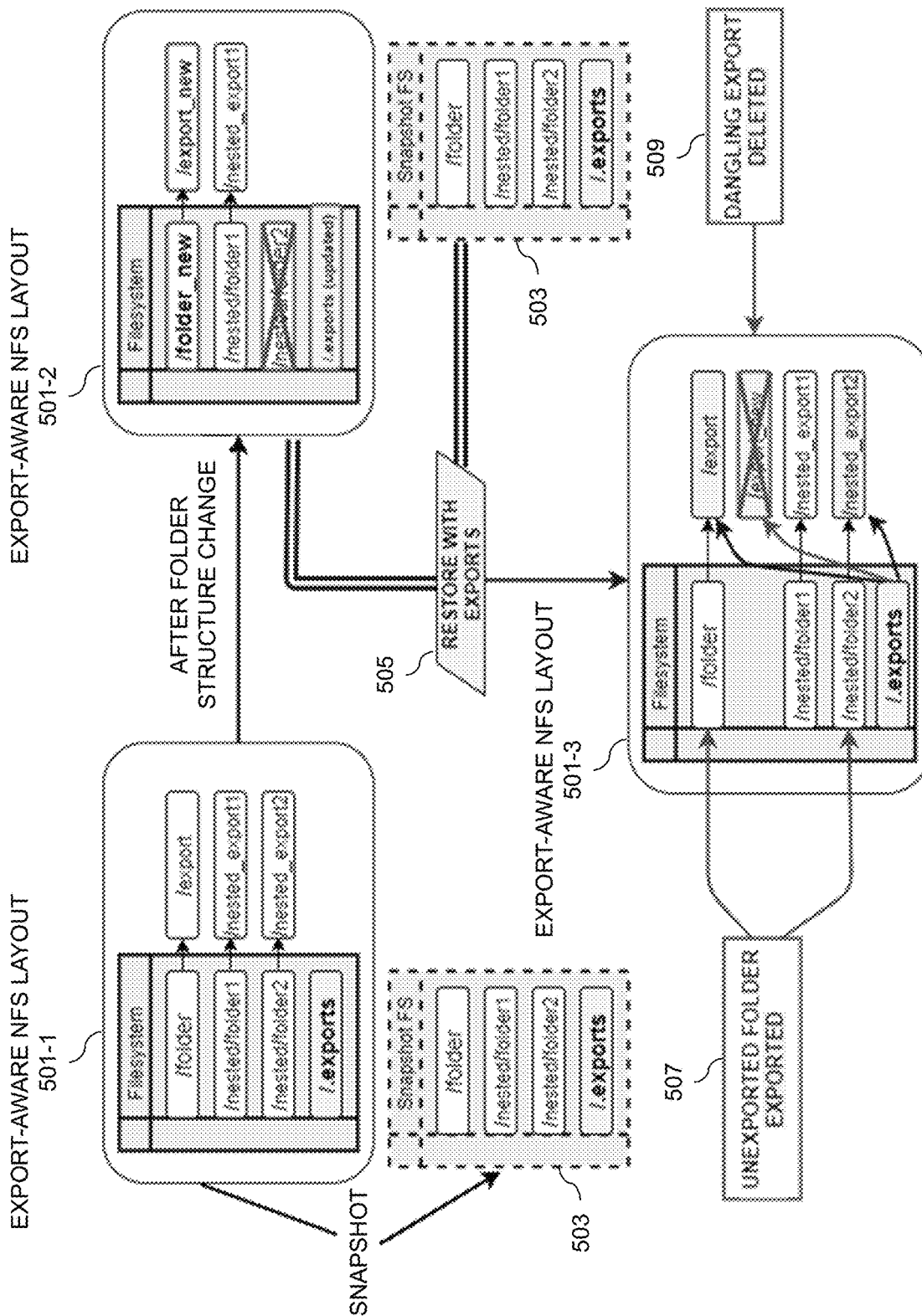
FIG. 5 shows network filesystem layouts before a folder structure change, after a folder structure change, and following a restore operation from an exports-aware filesystem snapshot in an illustrative embodiment.

FIG. 5 shows a set of export-aware NFS layouts 501-1, 501-2 and 501-3 (collectively, export-aware NFS layouts 501). The export-aware NFS layout 501-1 comprises a filesystem including /folder, /nested/folder1 and /nested/folder2 with associated exports/export, /nested_export1, and /nested_export2. The filesystem further includes a ".exports" file as described above (/.exports) which contains metadata for the exports. In the FIG. 5 example, the NFS export (/export) includes the two nested folders of the filesystem (/nested/folder1 and /nested/folder2). Although not shown for clarity of illustration, the filesystem may include various other folders which are not part of the NFS export. A snapshot 503 is generated of the filesystem that is part of the exports-aware NFS layout 501-1. The snapshot 503 may comprise a point-in-time snapshot of all of the filesystem data, which includes a metadata file (/.exports) with exports information for the filesystem at the time the snapshot 503 is taken. This is contrast with snapshot 403 in the FIG. 4 example, which did not include export information as the NFS layout 401-1 was not made "export-aware" via inclusion of a ".exports" metadata file.

After a folder structure change of an export, the export-aware NFS layout 501-1 is updated to export-aware NFS layout 501-2. In the FIG. 5 example, the updated export-aware NFS layout 501-2 includes a filesystem structure with a new export layout (e.g., /folder new with associated export/export_new). The new export layout includes /nested/folder1 but not /nested/folder2. It should be noted that this does not mean that the /nested/folder2 is actually removed or deleted from the filesystem—it may just not be part of the new export. The filesystem in the updated export-aware NFS layout 501-2 includes an updated /.exports metadata file which contains information reflecting the change in export.

If a user initiates a restore operation 505 for the filesystem using the snapshot 503, the resulting recovered or restored export-aware NFS layout 501-3 will include the filesystem from the snapshot 503 (e.g., including/folder, /nested/folder1, /nested/folder2, and the /.exports metadata file). The /.exports metadata file in the restored export-aware NFS layout 501-3 may be used to restore the correct export layout as captured in the snapshot 503. Thus, the unexported folder 407 from the FIG. 4 example will be correctly exported 507 in the FIG. 5 example and the dangling export 409 from the FIG. 4 example will be correctly deleted 509 in the FIG. 5 example.

Advantageously, the exports metadata file (".exports") will consume minimal space as it contains only metadata of exports for a filesystem. Further, as the export creation and modifications are simple and fast at the NFS server/storage controller level, the export operations performed during restore or recovery are also fast. Hence, recovering exports as part of a snapshot restore operation will significantly reduce the application RTO compared to conventional approaches where exports are manually managed and restored/recovered. The NFS server/storage controller can even differentiate a normal restore from an "export-aware"

restore (also referred to as a restore-with-exports). With export-aware NFS filesystem snapshots, the NFS server/storage controller can also provide multiple additional controls for application recovery software during restore or recovery.

A description of commands which may be used for restore or recovery of NAS filesystem snapshots will now be described. The command "restore" may be used to perform a regular or non-export-aware restore, where the filesystem only will be recovered (e.g., even where the filesystem snapshot used is an exports-aware filesystem snapshot). A number of storage controls or commands can be exploited using export-aware filesystem snapshots. The command "restore-with-exports" restores the filesystem using the filesystem snapshot and also restores exports (e.g., using information included in the ".exports" metadata file). The command "restore-with-exports-access no" restores the filesystem using the filesystem snapshot and also restores exports (e.g., using information includes in the ".exports" metadata file) but without host access. This command is helpful when the exports are to be restored to different NFS clients than the original NFS clients. The command "recovery-with-exports-snap snap_id-clone new_clone-export_suffix SUFFIX" recovers the filesystem using the filesystem snapshot using a clone (new_clone) and the exports are automatically created with a suffix (SUFFIX). The suffix option can also be used with restore operations (e.g., using the "-restore-with-exports" and "restore-with-exports-access no" commands). This command may be used to lower application RTO during snapshot recovery.

Illustrative embodiments provide techniques for generating exports-aware NFS filesystem snapshots, along with techniques for exports-powered restore and recovery operation using the exports-aware NFS filesystem snapshots. Such techniques provide a number of advantages relative to conventional approaches, including the ability to easily manage export layouts during restore and recover operations of filesystem snapshots, reduced application RTO, and freeing users from the burden of manually managing filesystem exports along with permission and access information from backup or CDM software or tools to the storage system. Thus, the techniques described herein can make backup system cataloging easier and faster.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing network shares using network share-aware filesystem snapshots will now be described in greater detail with reference to FIGS. 6 and 7. Although described in the context of system 100, these platforms may also be used to implement at least portions of other information processing systems in other embodiments.

Figure 6:
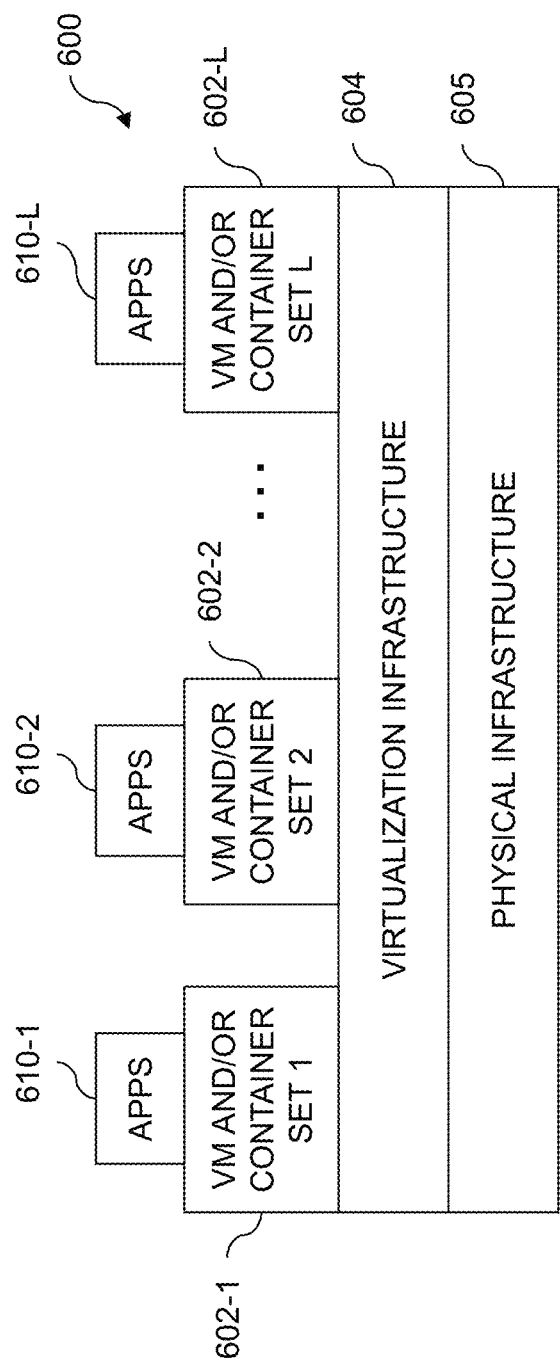
FIGS. 6 and 7 show examples of processing platforms that may be utilized to implement at least a portion of an information processing system in illustrative embodiments.
Figure 7:
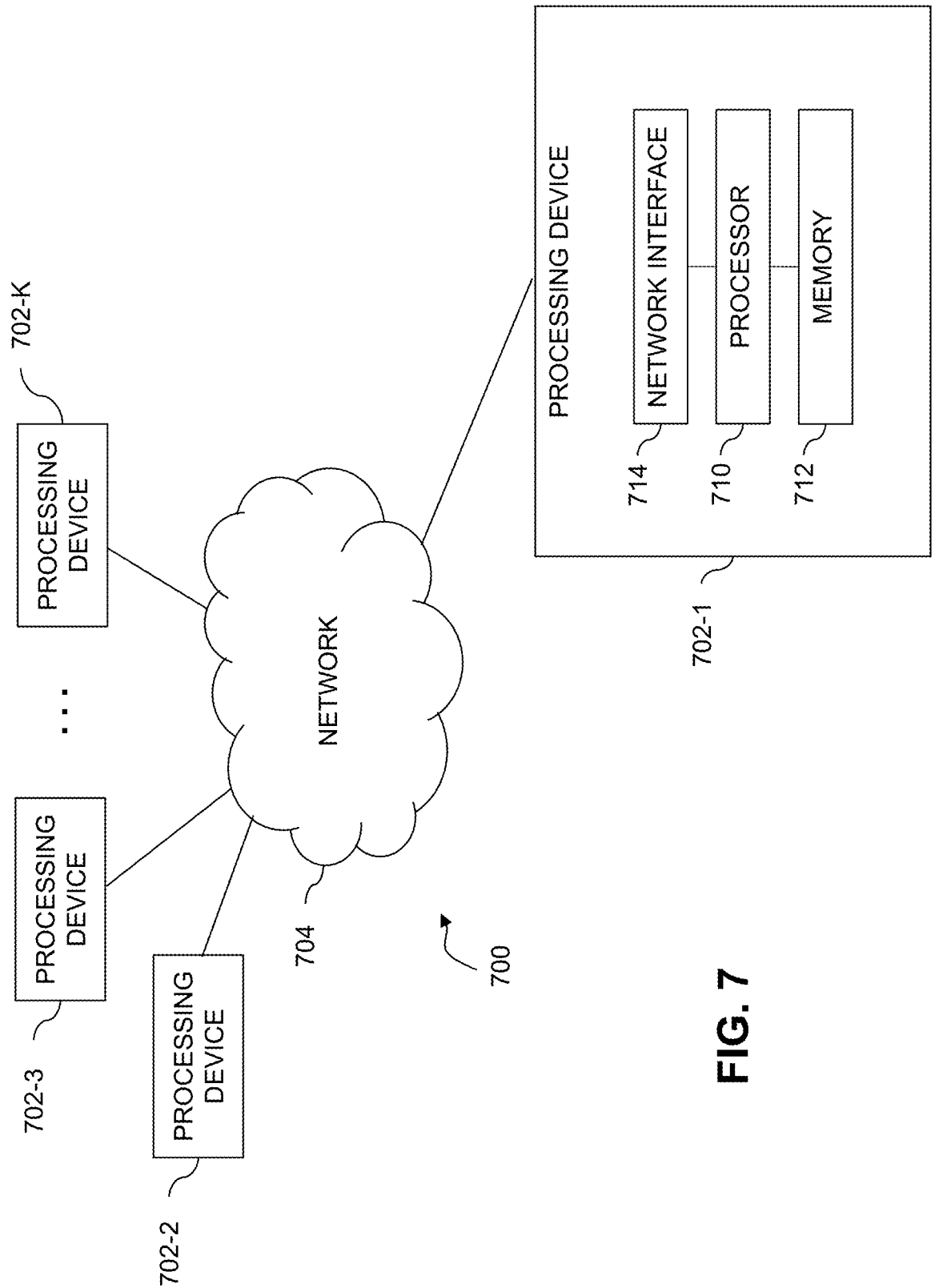

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing network shares using network share-aware filesystem snapshots as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, network shares, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        identifying one or more network shares of a filesystem;
        storing, in the filesystem, at least one network share metadata file comprising metadata characterizing the identified one or more network shares of the filesystem;
        generating a snapshot of the filesystem, wherein the snapshot comprises the at least one network share metadata file, and wherein the generated snapshot is utilizable for performing a recovery of the filesystem and the identified one or more network shares using at least a portion of the metadata from the at least one network share metadata file;
        receiving an instruction to perform recovery of the filesystem, the instruction comprising one or more recovery parameters specifying a given one of two or more different types of recovery of the filesystem; and
        performing the given type of recovery of the filesystem utilizing the generated snapshot;
    wherein the two or more different types of recovery of the filesystem comprise at least a first type of recovery that includes restoration of the identified one or more network shares and at least a second type of recovery that does not include restoration of the identified one or more network shares.

2. The apparatus of claim 1 wherein the filesystem comprises a network filesystem (NFS) filesystem and the identified one or more network shares comprise one or more NFS exports.

3. The apparatus of claim 1 wherein the metadata characterizing a given one of the identified one or more network shares of the filesystem comprises layout information for a folder structure of the filesystem utilized by the given network share.

4. The apparatus of claim 3 wherein the layout information for the folder structure of the filesystem utilized by the given network share comprise a nested folder structure of the given network share.

5. The apparatus of claim 1 wherein the metadata characterizing a given one of the identified one or more network shares of the filesystem comprises access information for the given network share.

6. The apparatus of claim 1 wherein the metadata characterizing a given one of the identified one or more network shares of the filesystem comprises security information for the given network share.

7. The apparatus of claim 1 wherein performing the given type of recovery of the filesystem comprises utilizing the generated snapshot to recover the filesystem and the identified one or more network shares using at least a portion of the metadata from the at least one network share metadata file.

8. The apparatus of claim 1 wherein the at least one processing device is further configured to perform the step of determining whether to restore the identified one or more network shares based at least in part on the one or more recovery parameters in the received instruction.

9. The apparatus of claim 8 wherein the filesystem is recovered without recovering the identified one or more network shares responsive to the one or more recovery parameters in the received instruction specifying a network share-unaware recovery of the filesystem.

10. The apparatus of claim 8 wherein the filesystem is recovered with the identified one or more network shares responsive to the one or more recovery parameters in the received instruction specifying a network share-aware recovery of the filesystem.

11. The apparatus of claim 8 wherein the filesystem is recovered with the identified one or more network shares without host access to the identified one or more network shares responsive to the one or more recovery parameters in the received instruction specifying a network share-aware recovery of the filesystem without host access.

12. The apparatus of claim 8 wherein the identified one or more network shares are created with a designated suffix responsive to the one or more recovery parameters in the received instruction specifying a network-share aware recovery of the file system with the designated suffix.

13. The apparatus of claim 8 wherein the filesystem is recovered to a designated clone with the identified one or more network shares responsive to the one or more recovery parameters in the received instruction specifying a network-share aware recovery of the file system to the designated clone.

14. The apparatus of claim 13 wherein the identified one or more network shares are created with a designated suffix responsive to the one or more recovery parameters in the received instruction specifying a network-share aware recovery of the file system to the designated clone with the designated suffix.

15. A computer program product comprising a non-transitory processor-readable storage medium having stored therein program code of one or more software programs, wherein the program code when executed by at least one processing device causes the at least one processing device to perform steps of:
   identifying one or more network shares of a filesystem;
   storing, in the filesystem, at least one network share metadata file comprising metadata characterizing the identified one or more network shares of the filesystem;
   generating a snapshot of the filesystem, the generated snapshot comprising the at least one network share metadata file, and wherein the generated snapshot is utilizable for performing a recovery of the filesystem and the identified one or more network shares using at least a portion of the metadata from the at least one network share metadata file;
   receiving an instruction to perform recovery of the filesystem, the instruction comprising one or more recovery parameters specifying a given one of two or more different types of recovery of the filesystem; and
   performing the given type of recovery of the filesystem utilizing the generated snapshot;
   wherein the two or more different types of recovery of the filesystem comprise at least a first type of recovery that includes restoration of the identified one or more network shares and at least a second type of recovery that does not include restoration of the identified one or more network shares.

16. The computer program product of claim 15 wherein the filesystem comprises a network filesystem (NFS) filesystem and the identified one or more network shares comprise one or more NFS exports.

17. The computer program product of claim 15 wherein performing the given type of recovery of the filesystem comprises utilizing the generated snapshot to recover the filesystem and the identified one or more network shares using at least a portion of the metadata from the at least one network share metadata file.

18. A method comprising:
   identifying one or more network shares of a filesystem;
   storing, in the filesystem, at least one network share metadata file comprising metadata characterizing the identified one or more network shares of the filesystem;
   generating a snapshot of the filesystem, the generated snapshot comprising the at least one network share metadata file, and wherein the generated snapshot is utilizable for performing a recovery of the filesystem and the identified one or more network shares using at least a portion of the metadata from the at least one network share metadata file;
   receiving an instruction to perform recovery of the filesystem, the instruction comprising one or more recovery parameters specifying a given one of two or more different types of recovery of the filesystem; and
   performing the given type of recovery of the filesystem utilizing the generated snapshot;
   wherein the two or more different types of recovery of the filesystem comprise at least a first type of recovery that includes restoration of the identified one or more network shares and at least a second type of recovery that does not include restoration of the identified one or more network shares; and
   wherein the method is performed by at least one processing device comprising a processor coupled to a memory.

19. The method of claim 18 wherein the filesystem comprises a network filesystem (NFS) filesystem and the identified one or more network shares comprise one or more NFS exports.

20. The method of claim 18 wherein performing the given type of recovery of the filesystem comprises utilizing the generated snapshot to recover the filesystem and the identified one or more network shares using at least a portion of the metadata from the at least one network share metadata file.

* * * * *